June 30, 1959  R. W. BIGGS  2,892,707
METHOD FOR PRODUCING BI-METALLIC ARTICLE
Filed July 27, 1956
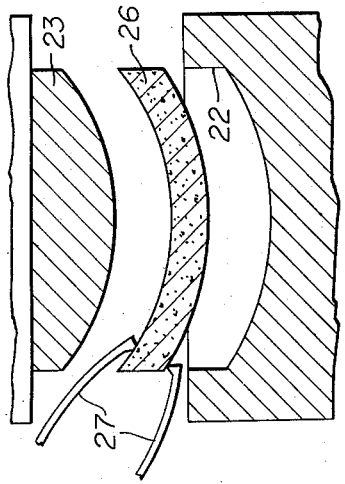
Fig. 2
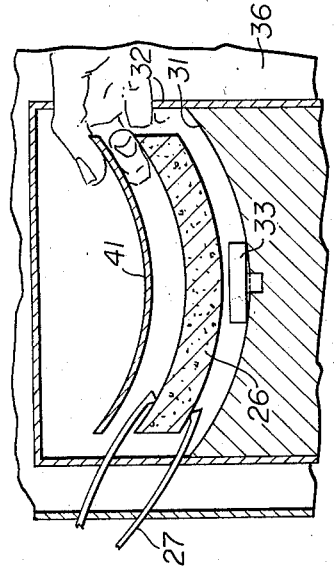
Fig. 3
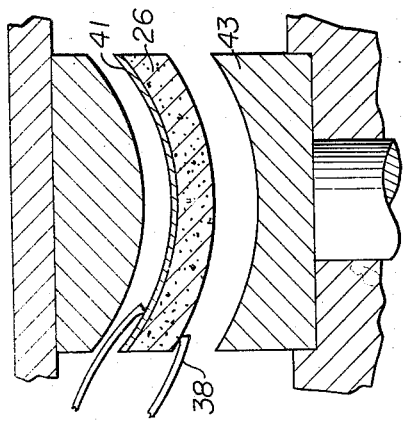
Fig. 4
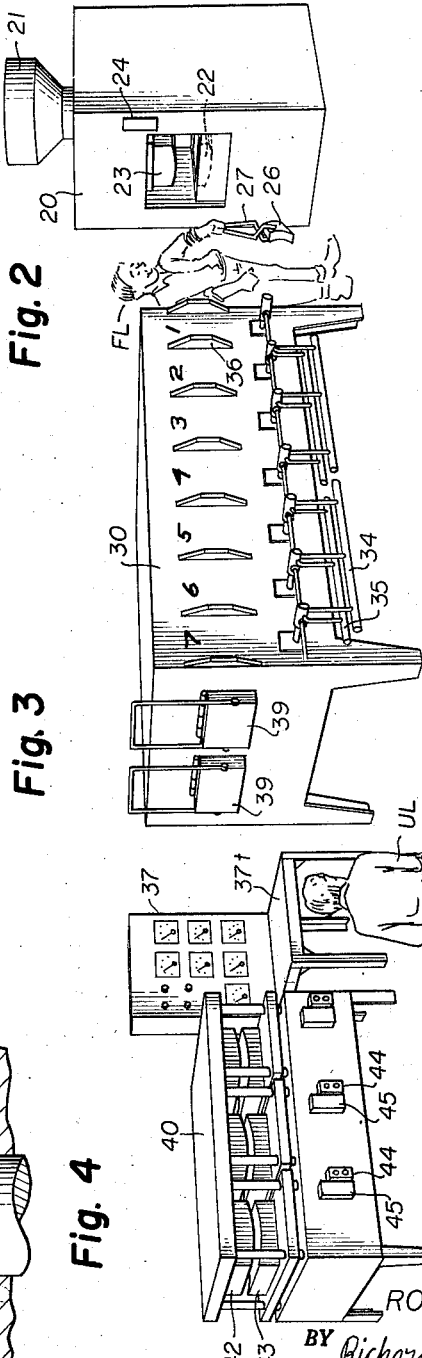
Fig. I
INVENTOR.
ROBERT W. BIGGS
BY Richard H. MacCutcheon
ATTORNEY

United States Patent Office 2,892,707
Patented June 30, 1959

2,892,707

METHOD FOR PRODUCING BI-METALLIC ARTICLE

Robert W. Biggs, Shaker Heights, Ohio, assignor to The S. K. Wellman Company, Bedford, Ohio, a corporation of Ohio Application July 27, 1956, Serial No. 600,531

3 Claims. (Cl. 75—208)

This invention relates to friction assemblies for vehicular use and to methods for producing bi-metallic articles such as brake blocks of the type comprising a curved metallic backing plate and integrally bonded thereto sintered friction material made of powdered metals predominantly. The invention is believed to have particular significance in connection with curved brake shoes or blocks of relatively great thickness as currently used for heavy motor vehicles such as trucks, tractors, truck trailers, and earth-moving machinery.

Friction articles of powdered predominantly metallic material, sintered and bonded to a metallic backing member, are well known to the art and have numerous advantages over fibrous facings, the sintered facings being less susceptible to changes in temperature and atmospheric conditions, less affected by oil, grease and foreign matter, and showing less wear with the same use.

Friction articles of the type referred to are produced by pressing or briquetting powders of suitable composition usually comprising metals predominantly and containing minor amounts of non-metallic ingredients such as graphite. The briquette or compact so formed is later heated to a sintering temperature, but because the metal powder even when sintered is rather porous and of low tensile strength, it is customary to provide a reinforcing backing plate of steel or of copper. Conventionally the heat of the sintering step is used both to cause the pressed powder to sinter and to integrally bond it to the backing plate.

Considerable heat is required for the sintering and considerable heat and also pressure are required for the bonding. Efforts to accomplish sintering and bonding simultaneously, by placing assembled compacts and backing members in a press and there subjecting them to both heat and pressure, have met with many inconveniences, difficulties, discouragement and even failures, particularly when curved parts are involved. For one thing, die parts in a heated press or furnace take a long time to heat, as do "separator" members usually used to achieve some production economies (see co-pending application Ser. No. 390,178, filed November 4, 1953, by Samuel K. Wellman). For another thing, the heat to which the die parts, pressure blocks, separators, etc., are subjected causes them to lose proper curvature so that inaccccurate products result. Of course the compact could be separately heated for sintering, and then allowed to cool, and then heated again along with the backing for bonding in a press, but the second heating step sinters the materials further (often too far) and the use of dual heats is slow and expensive. Also, when curved surfaces are involved, as for brake shoes, often the material is too thick to bend after bonding (e.g., when ¾" thick as required for large trucks) and of too great a curvature and too long an arc to properly press for bonding within a furnace where a pressure exerted at right angles to one part of an arc is not at all at right angles to another part of the same arc. This means that heretofore some articles could not be made at all, not even piecemeal as in co-pending application Ser. No. 390,178, filed November 4, 1953, by Samuel K. Wellman.

It is an object of the present invention to provide simple and inexpensive means for overcoming the above mentioned difficulties.

Other objects and advantages will become apparent and the invention may be better understood from consideration of the following description taken in connection with the accompanying drawing in which:

Fig. 1 is a diagrammatic view of cold press-furnace-hot press apparatus useful for performing a process according to the invention;

Fig. 2 is a cold press part section showing a pressed compact being removed from the front of "cold" press 20 of Fig. 1;

Fig. 3 is a furnace part section through one of two troughs of furnace 30 of Fig. 1, and showing a pressed compact and a steel backing being placed thereon; and Fig. 4 is a "hot" press part section showing a bonded assembly of compact and backing being removed from between the dies of hot press 40 of Fig. 1.

Referring now to Figure 1, and looking generally from right to left, there is shown cold press mechanism 20 provided with a hopper 21 for introducing a mixture of metallic and non-metallic powders, which, for example, may comprise a 500 pound mixture of 100 pounds of powdered graphite, 350 pounds of iron powder, and 50 pounds of cast iron grit, all of which amounts to percentages, by weight, as follows:

| | Percent |
|---|---|
| Graphite | 20 |
| Fe | 70 |
| Grit | 10 |

At some remote place, not shown, materials such as the above may be dried before use and mixed as in a cone blender for a blending time, for example, of 30 minutes, and then introduced into the hopper 21 from which they eventually enter into a contoured mold cavity 22 where they are compressed by downward movement of a co-operating die 23 the movement of which may be controlled from push buttons 24 by a furnace loading operator FL.

In accordance with one aspect of the present invention, the furnace loader man FL periodically calls for the pressing of curved compacts in the cold press 20, and ejection of each of them may be completely automatic by operation of mold collapsing means plus pushers (not shown), or the ejection may be by manual initiation of the operation of hydraulic or electrically actuated mold stripping means (as explained in Pat. 2,259,094, issued October 14, 1941, upon an application filed in the name of Samuel K. Wellman). In any event, somehow the pressed cold compact is removed from the mold cavity so that FL can grasp it by hand or by means of tongs 27, and then place compacts one by one upon either of two troughs 31 with which the furnace 30 is provided.

As indicated in Figure 1, the furnace 30 is of double trough type provided with side by side troughs 31 each of the type shown in the enlargement of Figure 3, lined with a refractory material and high temperature withstanding metallic enclosing walls 32 and pusher mechanism 33 which automatically periodically advances compacts from entry to discharge end of the furnace, advancing them substantially the width of a compact with each progression. The furnace or muffle 30 may be gas fired having suitable fuel and air pipes (indicated in part at 34, 35, respectively) and the products of combustion are all kept outside of the enclosure formed by the refractory and walls of the individual troughs.

If desired, cross headers 36 may be used to divide up the combustion chamber into separate zones (1-7, in Fig. 1) surrounding the troughs, with suitable fuel supply controls regulated to provide temperature settings as follows:

| | °F. |
|---|---|
| Zones 1 and 2 | 1200 |
| Zones 3 and 4 | 1450 |
| Zone 5 | 1950 |
| Zones 6 and 7 | 1950 |

Electrical controls of conventional type may be used to control the rate of compact travel (e.g., to have either or both troughs deliver one compact every 1½ minutes, or for some cases, depending upon materials used, every 30 seconds) and these rate controls, as well as temperature indicators and controls, may be conveniently grouped at a control console 37 where a furnace unloader operator UL may set temperatures as well as the rate of travel.

Broadly, the present invention comprises first compacting the powders in the "cold" press, then sintering in the muffle 30, and then "hot press bonding" in a "hot" press 40 which is not heated at all (except by the work) and in fact is preferably cooled as by circulating water. The bi-metallic article final product uses a solid metal backing plate 41 which could be introduced either for the first time adjacent the compact in the hot press 40, or in the open as upon a table portion 37t of the control console 37, but I find it preferable to preheat the backing by introducing it into the entry end of the muffle along with the individual compact. Thus, as illustrated in Figure 3, the FL operator may use tongs 27 to place the compact down on the trough 31, in front of a bar or other portion of pusher mechanism 33, and may use his fingers to place a backing 41 on top of the compact just as it enters the furnace. I have found that no "controlled" atmosphere is necessary in the furnace for either compact or backing, at least if the compact mix is of the type above described, or at least more than 15% carbonaceous, so that high graphite content will provide sufficient off-gas to prevent oxidation of either the compact or the steel backing. As a matter of fact with a compact mix as per stated example, either hot rolled steel or cold rolled steel can be used for the backing member and it is not necessary to pickle the hot rolled steel because the off-gas from the compact reduces the scale.

With this high carbon mix (e.g., with graphite not less than 15% by weight) this off-gas continues to protect compact and backing for the limited time necessary for operator UL to remove the work from the furnace with his tongs 38 and transfer it through the air and place it immediately in any one of the three independently operable stations of the hot press 40, where it is immediately pressed and held (as hereafter described) for the bond while the off-gassing continues.

It will be observed that in the cold press 20, the die cavity 22 and die 23 are contoured to form the work substantially as desired. The trough shaped top of each refractory bottom 31 in the furnace is likewise contoured. These contours need not be made with any great accuracy, but in the hot press 40, each top and bottom pressing block, 42, 43, respectively, is provided with the exact curvature of the desired finished part, and I find it preferable to have these blocks or dies water-cooled to retain their exact curvature as one of the blocks, such as the bottom block 43, is moved by hydraulic or other pressure toward the other to finally bond the curved compact to the backing, as well as to finally shape both members exactly as desired.

The three stations of hot press 40 (in which there may really be nothing "hot" but the work) are individually controlled through respective push-button stations 44 each operable to provide, as through a respective electrical timer 45, an exact (though adjustable) cycle of pressing time which for the mix of the example may be one or 1¼ minutes of intermittent "hold" pressure (made up of 1 to 1¼ minutes of repeated cycles of 4 seconds close, 1 second open, to take care of work shrinkage, 4 seconds close, etc.) after which automatic or manual means may be relied on to provide 1 minute "full open" to provide sufficient die cooling time. Good results, using such a bonding time of 1¼ minutes, have been secured with a bonding pressure of 1500 p.s.i. Because the off-gas from the compact may diminish during this bonding time, or because it may be desired to press a mix other than the high carbon content mix given by way of example, it is sometimes desirable to provide a natural gas curtain around the hot press throughout the entire bonding cycle with proper ducting (not shown) to carry the dangerous gases away.

Those skilled in the art will realize that Figs. 1-4 of the drawing are merely illustrative of process and some apparatus and some additional components may be required. For example, there may be, though not shown, a hydraulic pump or other means for supplying pressure for operating each press, and automatic or manual means for operating furnace entry doors (not shown) and additional means for operating one or the other of the furnace exit doors 39 whenever a compact in the particular trough is ready to be removed.

In operation, exact pressures used depend in each case upon exact dimensions of the article finally desired, and also upon the materials used. Final structural strength, wear rates, and other physical properties have been found to depend upon many things including "cold" compacting pressure, sintering temperature, and "hot" press bonding pressure. With the 20 C, 70 Fe, 10 grit mix given above, it was found that 15 t.s.i. was a suitable cold molding pressure for certain circumstances. Other considerations led to the conclusion that 1500 p.s.i. was a suitable hot press bonding pressure for the particular conditions under consideration. These are details which might conceivably be worked out by anyone skilled in the art, but an important difference in the present invention lies in the fact that it permits full processing of large curved compacts by heating the materials involved when they are not under pressure, thus not only reducing the cost of required apparatus (because press parts are not involved in the furnace), and reducing difficulties of holding curvature, but in many cases for the first time making possible the production of the article by any method. Thus, with methods according to the invention I can make articles ¾" thick (or even thicker) and curved as much as through an arcuate included angle of 60° or 70° (i.e., well over 30°).

By pressing in water-cooled dies it is possible to accomplish the bonding and any necessary final consolidation in a very short time. Water cooling preserves the curvature of the dies and the friction material and backing are forced to accept this curvature. Over-all time for the process of the invention is much less than that for more conventional processes where it is necessary to not only get the work material up to heat but also to heat separators, blocks and dies (see application Serial No. 390,178, filed November 4, 1953, in the name of Samuel K. Wellman). I have found it possible to provide adequate bond and densification suitable to give minimum wear rate after merely heating the stock in a furnace without any pressure or specific furnace atmosphere at all, and have found that wherever sufficient graphite is used the material will not oxidize so as to make bonding impossible, and it is this same graphite which gives maximal operating characteristics as explained in co-pending applications Serial No. 549,727, filed November 29, 1955, in the name of Samuel K. Wellman, and Serial No. 552,689, filed November 29, 1955, now abandoned, in the name of Chester A. Bielawski. With respect to the present invention, however, it is not strictly "carbon" content which controls because it depends upon the form on which the carbon is present. Thus, graphite has been found to give better gassing than petroleum coke. For gassing charcoal is even better than graphite but it is not strong enough nor good enough friction-wise to be used, whereas graphite provides adequate mechanical properties for the final article and at the same time provides sufficient protective atmosphere automatically by off-gassing of the friction material.

I have found for specific off-the-road vehicle arcuate brake linings which have heretofore been considered too curved to press, and heretofore considered too thick to roll bend after flat pressing as described in Patent 2,446,891, issued August 10, 1948, upon application filed by C. H. Tower and F. J. Lowey, that the articles can adequately be made according to the herein described process with the result of quadrupling life of $1600 drums with which the vehicles are equipped while giving long lining life, actually about five times the lining life of prior art asbestos lining material.

With processes according to the present invention curvatures are no problem because the final curvatures (which are the only critical ones) are determined by water cooled dies which hold their curvatures because they need not be heated for sintering and bonding of friction material. No complicated bending of the materials is necessitated and all that is required is to press the powders, to heat them (both for sintering and bonding) and then to press bond them to the requisite backing material. Actually, it is believed that the water cooled "hot" press operation not only bonds the friction material to the backing but may be used to complete the sintering of the material since there is plenty of residual heat in the sintered compact to not only accomplish the bonding but to provide further sintering and cohesion of the friction material itself.

While I have illustrated and described a particular embodiment, various modifications may obviously be made without departing from the true spirit and scope of the invention which is intended not to be limited except by the scope of the following claims and their reasonable equivalents.

I claim:
1. The method of making an arcuate bi-metallic brake block of relatively large dimensions which comprises the steps of providing a curved backing plate member and a mixture of powdered materials comprising metals predominantly, compressing the powdered materials separately from the backing plate member in a first press to form a curved compact member, assembling the backing plate member upon the curved compact member within a furnace, applying heat without pressure to the members sufficient to cause sintering of the compact member, and removing the assembly from the furnace and placing it in a second press without substantial reduction in temperature and there pressing the members into bonded relationship without the application of any heat except that which is residual in the members themselves.

2. The method of making an arcuate bi-metallic brake block of relatively large dimensions which comprises the steps of providing a curved backing plate member and a mixture of powdered material comprising metals predominantly and not less than fifteen percent graphite, compressing the powdered materials separately from the backing plate member in a first press to form a curved compact member, assembling the backing plate member upon the curved compact member within a gas combustion furnace, applying heat without pressure to the members sufficient to cause sintering of the compact member while protecting the members from contact with flame and products of combustion, and removing the assembly from the furnace and placing it in a second press without substantial reduction in temperature and there pressing the members into bonded relationship without the application of any heat except that which is residual in the members themselves.

3. The method of making an arcuate bi-metallic brake block of relatively large dimensions which comprises the steps of providing a curved backing plate member and a mixture of powdered materials comprising, by weight, substantially seventy percent iron, twenty percent graphite, and ten percent cast iron grit, all previously dried and blended together, compressing the powdered materials separately from the backing plate member in a first press to form a curved compact member, assembling the backing plate member upon the curved compact member within a furnace, applying heat without pressure to the members sufficient to cause sintering of the compact member, and removing the assembly from the furnace and placing it in a second press without substantial reduction in temperature and there pressing the members into bonded relationship without the application of any heat except that which is residual in the members themselves.

References Cited in the file of this patent

UNITED STATES PATENTS

| | | |
|---|---|---|
| 2,152,611 | Swartz | Mar. 28, 1939 |
| 2,287,952 | Tormyn | June 30, 1942 |
| 2,299,192 | Tormyn | Oct. 26, 1942 |
| 2,317,786 | Lubbe | Apr. 27, 1943 |
| 2,332,737 | Marvin et al. | Oct. 26, 1943 |